US012664014B2

(12) United States Patent  
Reddy et al.

(10) Patent No.: US 12,664,014 B2  
(45) Date of Patent: Jun. 23, 2026

(54) EFFICIENT CLUSTER UPGRADE AND DOWNGRADE

(71) Applicant: Dell Products L.P., Round Rock, TX (US)

(72) Inventors: A Ashok Kumar Reddy, Bangalore (IN); Shantanu Joshi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 486 days.

(21) Appl. No.: 18/474,397

(22) Filed: Sep. 26, 2023

(65) Prior Publication Data

US 2025/0103373 A1 Mar. 27, 2025

(51) Int. Cl.  
*G06F 9/455* (2018.01)  
*G06F 8/65* (2018.01)

(52) U.S. Cl.  
CPC ........ *G06F 9/45558* (2013.01); *G06F 9/4555* (2013.01); *G06F 8/65* (2013.01); *G06F 2009/4557* (2013.01); *G06F 2009/45583* (2013.01)

(58) Field of Classification Search  
CPC .............. G06F 9/45558; G06F 9/4555; G06F 2009/4557; G06F 2009/45583; G06F 8/65  
See application file for complete search history.

(56) References Cited

U.S. PATENT DOCUMENTS

| | | | | |
|---|---|---|---|---|
| 7,788,522 B1 * | 8/2010 | Abdelaziz | ............... | H04L 41/12 |
| | | | | 709/209 |
| 2022/0182444 A1 * | 6/2022 | Christensen | ........ | H04L 67/1068 |
| 2023/0153162 A1 * | 5/2023 | Baillargeon | .......... | G06F 9/5044 |
| | | | | 718/104 |
| 2024/0202019 A1 * | 6/2024 | Jigalur | ................ | G06F 9/45558 |

* cited by examiner

*Primary Examiner* — Michael W Ayers  
(74) *Attorney, Agent, or Firm* — DALY, CROWLEY, MOFFORD & DURKEE, LLP

(57) ABSTRACT

An example methodology includes declaring a node in a cluster of multiple nodes as a lead node to perform a cluster upgrade. While the lead node is performing the upgrade operations, the remaining nodes in the cluster continue to provide the cluster services. The upgrade operations on the lead node include migrating applications on the lead node to one of the other nodes in the cluster and performing upgrade of the lead node. In some cases, the upgrade operations include rebooting the lead node with a new OS image and installing new versions of the applications or re-installing the same applications on the lead node. The upgrade operations on the lead node may also include, once the lead node is upgraded, stopping applications and cluster services on the other nodes in the cluster, creating a new cluster that includes the lead node, and starting the applications on the lead node.

20 Claims, 5 Drawing Sheets

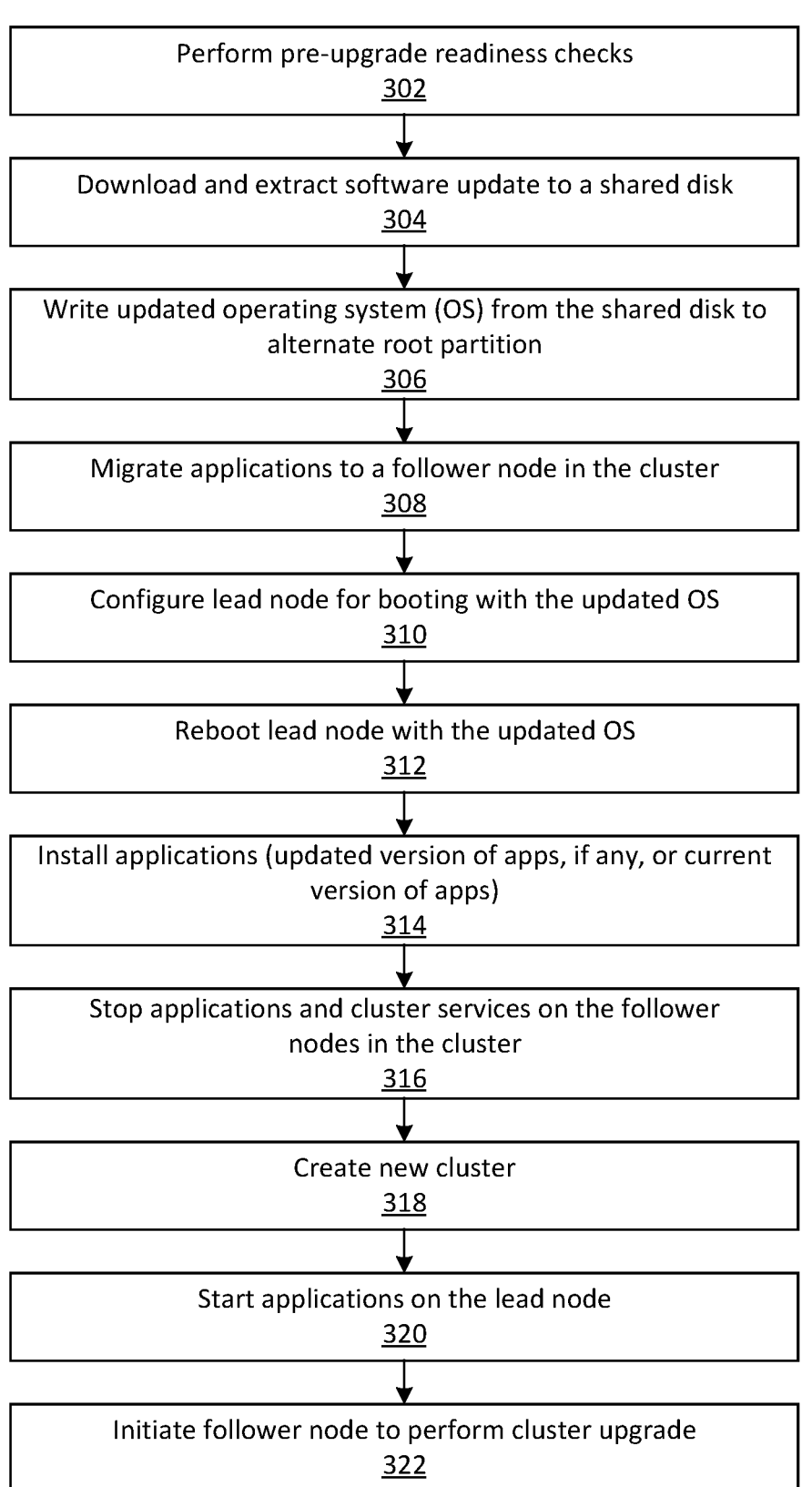

300

Perform pre-upgrade readiness checks
302

Download and extract software update to a shared disk
304

Write updated operating system (OS) from the shared disk to
alternate root partition
306

Migrate applications to a follower node in the cluster
308

Configure lead node for booting with the updated OS
310

Reboot lead node with the updated OS
312

Install applications (updated version of apps, if any, or current
version of apps)
314

Stop applications and cluster services on the follower
nodes in the cluster
316

Create new cluster
318

Start applications on the lead node
320

Initiate follower node to perform cluster upgrade
322

Write updated operating system (OS) from a shared disk to
alternate root partition
402

Configure follower node for booting with the updated OS
404

Reboot follower node with the updated OS
406

Install applications (updated version of apps, if any, or current
version of apps)
408

Join the follower node to the new cluster
410

Start applications on the follower node
412

EFFICIENT CLUSTER UPGRADE AND DOWNGRADE

BACKGROUND

A storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

Storage systems may implement a cluster environment where multiple nodes (or "hosts) service a cluster of storage devices. For example, a high availability (HA) cluster is a group of nodes that operate as a single system and provide continuous availability without failing for a designated period. The nodes may host applications that utilize the services provided by the system, such as the data services provided by storage systems. In containerized environments, applications can run in fully packaged, isolated, and portable computing environments, called containers, while using a shared operating system (OS).

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes determining whether a node is a lead node in a cluster including the lead node and one or more follower nodes and, responsive to a determination that the node is the lead node in the cluster, by the lead node, downloading a software update, wherein the software update includes an updated version of an operating system (OS), and extracting the software update to a shared disk. The method also includes, by the lead node, writing the updated version of the OS to an alternate root partition of the lead node, migrating one or more first applications from the lead node to one of the one or more follower nodes in the cluster, and rebooting the lead node using the alternate root partition with the updated version of the OS. The method further includes, by the lead node, installing one or more second applications on the lead node, stopping applications and cluster services on the one or more follower nodes in the cluster, wherein the applications include the one or more first applications, creating a new cluster, wherein the new cluster includes the lead node, and starting the one or more second applications on the lead node.

In some embodiments, the updated version of the OS is a newer version of the OS.

In some embodiments, the updated version of the OS is an older version of the OS.

In some embodiments, one of the one or more second applications is a same version of one of the one or more first applications.

In some embodiments, the software update includes a newer version of one of the one or more first applications, and wherein the one or more second applications include the newer version of one of the one or more first applications.

In some embodiments, the software update includes an older version of one of the one or more first applications, and wherein the one or more second applications include the older version of one of the one or more first applications.

In some embodiments, the method also includes, responsive to a determination that the node is one of the one or more follower nodes in the cluster, by the follower node, writing the updated version of the OS from the shared disk to an alternate root partition of the follower node and rebooting the follower node using the alternate root partition with the updated version of the OS. The method further includes, by the follower node, installing one or more third applications on the follower node, joining the new cluster, wherein the new cluster includes the lead node, and starting the one or more third applications on the follower node.

In some embodiments, the one or more third applications include a current version of an application on the follower node.

In some embodiments, the one or more third applications include a newer version of an application on the follower node.

In some embodiments, the one or more third applications include an older version of an application on the follower node.

According to another illustrative embodiment provided to illustrate the broader concepts described herein, a computing device includes one or more non-transitory machine-readable mediums configured to store instructions and one or more processors configured to execute the instructions stored on the one or more non-transitory machine-readable mediums. Execution of the instructions causes the one or more processors to carry out a process including determining whether the computing device is a lead node in a cluster including the lead node and one or more follower nodes and, responsive to a determination that the computing device is the lead node in the cluster, downloading a software update, wherein the software update includes an updated version of an operating system (OS), and extracting the software update to a shared disk. The process also includes, responsive to a determination that the computing device is the lead node in the cluster, writing the updated version of the OS to an alternate root partition of the lead node, migrating one or more first applications from the lead node to one of the one or more follower nodes in the cluster, and rebooting the lead node using the alternate root partition with the updated version of the OS. The process further includes, responsive to a determination that the computing device is the lead node in the cluster, installing one or more second applications on the lead node, stopping applications and cluster services on the one or more follower nodes in the cluster, wherein the applications include the one or more first applications, creating a new cluster, wherein the new cluster includes the lead node, and starting the one or more second applications on the lead node.

In some embodiments, the process also includes, responsive to a determination that the computing device is one of the one or more follower nodes in the cluster, writing the updated version of the OS from the shared disk to an alternate root partition of the follower node and rebooting the follower node using the alternate root partition with the updated version of the OS. The process further includes, responsive to a determination that the computing device is one of the one or more follower nodes in the cluster, installing one or more third applications on the follower node, joining the new cluster, wherein the new cluster includes the lead node, and starting the one or more third applications on the follower node.

According to another illustrative embodiment provided to illustrate the broader concepts described herein, a non-transitory machine-readable medium encodes instructions that when executed by one or more processors cause a process to be carried out, the process including determining whether a node is a lead node in a cluster including the lead node and one or more follower nodes and, responsive to a determination that the node is the lead node in the cluster, by the lead node, downloading a software update, wherein the software update includes an updated version of an operating system (OS), and extracting the software update to a shared disk. The process also includes, by the lead node, writing the updated version of the OS to an alternate root partition of the lead node, migrating one or more first applications from the lead node to one of the one or more follower nodes in the cluster, and rebooting the lead node using the alternate root partition with the updated version of the OS. The process further includes, by the lead node, installing one or more second applications on the lead node, stopping applications and cluster services on the one or more follower nodes in the cluster, wherein the applications include the one or more first applications, creating a new cluster, wherein the new cluster includes the lead node, and starting the one or more second applications on the lead node. The process also includes, responsive to a determination that the node is one of the one or more follower nodes in the cluster, by the follower node, writing the updated version of the OS from the shared disk to an alternate root partition of the follower node and rebooting the follower node using the alternate root partition with the updated version of the OS. The process further includes, by the follower node, installing one or more third applications on the follower node, joining the new cluster, wherein the new cluster includes the lead node, and starting the one or more third applications on the follower node.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 is a flow diagram of an example process for efficient upgrade of a lead node in a cluster, in accordance with an embodiment of the present disclosure.

DETAILED DESCRIPTION

Figure 1:
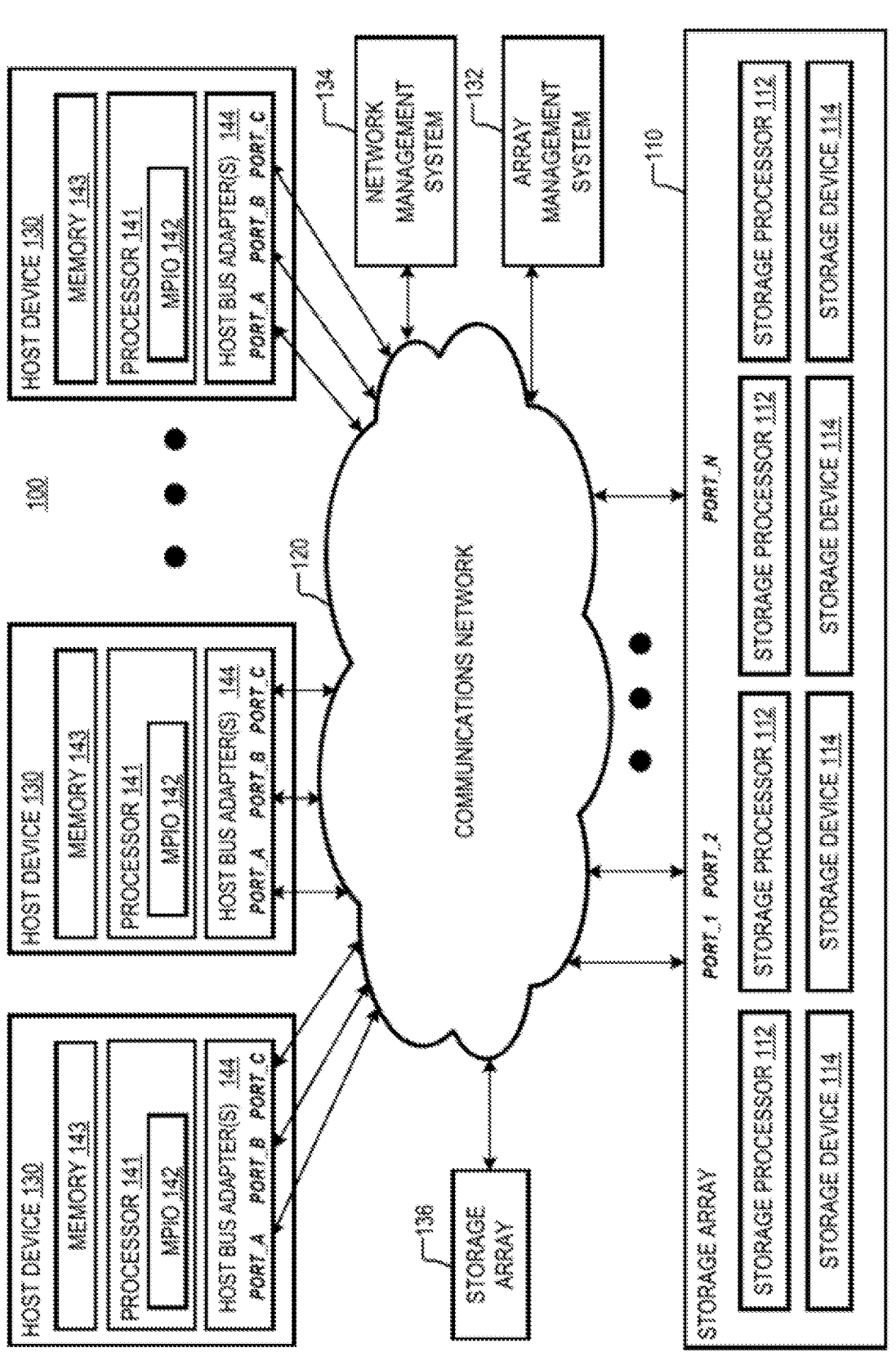
FIG. 1 is a block diagram of an illustrative storage system within which embodiments of the present disclosure may be utilized.

Computer clusters may be subject to periodic upgrades. For example, a cluster upgrade may involve updates to the underlying operation system (OS), clustering software, which is typically provided by or a part of the OS, and/or applications to their updated versions. In some cases, the updated versions may be earlier versions (i.e., older versions) or later versions (i.e., newer versions). One approach to performing a cluster upgrade is a rolling upgrade (also known as an online upgrade) in which respective nodes of a cluster are upgraded one at a time in sequence, such that only one node is unavailable due to the upgrade operations. The remaining nodes in the cluster continue to service client requests thus providing maximum availability and preventing loss of access to the services provided by the cluster. However, rolling upgrades are not suitable for major upgrades (i.e., major updates or changes) to the cluster. That is, rolling upgrades are only suitable for supported/compatible upgrade paths.

Another approach to performing a cluster upgrade is an offline upgrade in which all client access to a cluster is stopped, all the nodes of the cluster are brought down together and upgraded, and the cluster is brought back online and client access to the cluster is restored. Offline upgrades are suitable for major upgrades (e.g., supports major version changes). However, during the upgrade window, the cluster is down and not available to service client requests.

Disclosed herein are concepts, structures, and techniques for efficient cluster upgrade and downgrade. In some embodiments, a node in a cluster of two or more nodes is declared a lead node in the cluster and the remaining nodes are declared follower nodes in the cluster. The lead node in the cluster (also referred to herein as a "cluster leader" or more simply a "leader"), is the node that first performs the upgrade. While the lead node is performing the upgrade operations, the follower nodes in the cluster continue to provide the cluster services. The upgrade operations on the lead node may include migrating applications on the lead node to one of the follower nodes in the cluster and performing upgrade of the lead node. In some cases, the upgrade of the lead node may include rebooting the lead node with an updated version of the operating system (OS) (e.g., a new OS image) and installing updated versions of applications or re-installing the current versions of applications on the lead node. The upgrade operations on the lead node may also include, once the lead node is upgraded, stopping applications and cluster services on the follower nodes in the cluster, creating a new cluster that includes the lead node, and starting the applications on the lead node. Once the new cluster with the upgraded lead node is created and running, each of the follower nodes in the cluster (also referred to herein as a "cluster follower" or more simply a "follower"), is upgraded in turn. The upgrade operations on the follower node may include rebooting the follower node with the updated version of the OS (e.g., the new OS image) and installing updated versions of applications or re-installing the current versions of applications on the follower node. The upgrade operations on the follower node may also include, once the follower node is upgraded, joining the new cluster created by the lead node and starting the applications on the follower node. Each of the remaining follower nodes in the original cluster may be upgraded and joined to the new cluster in a similar manner. Note that at least one node in the cluster, e.g., the original cluster or the new cluster, continues to provide the cluster services during the upgrade of the original cluster. That is, at no point in time during the upgrade is the cluster down and not available to service client requests. Also note that the upgrades to the cluster as variously disclosed herein are suitable to provide major upgrades (e.g., major software upgrades) to the cluster. Numerous configurations and variations will be apparent in light of this disclosure.

As used herein, the term "upgrade" refers, in addition to its ordinary meaning, to the process of replacing a product with another version of the same product. For instance, in the context of computing, an upgrade can generally be understood to be a replacement of hardware, software, or firmware components of a system with an updated version of the same component. For example, a software upgrade includes the process of replacing a current version of software with an updated version of the software. The updated version of the software may be a newer version or an older version of the software. As such, an upgrade as used herein is intended to be broadly construed to encompass both an upgrade (e.g., replacing a current version with a newer version) as well as a downgrade (e.g., replacing a current version with an older version). An upgrade can be either a major upgrade or a minor upgrade.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 500 of FIG. 5. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 5:
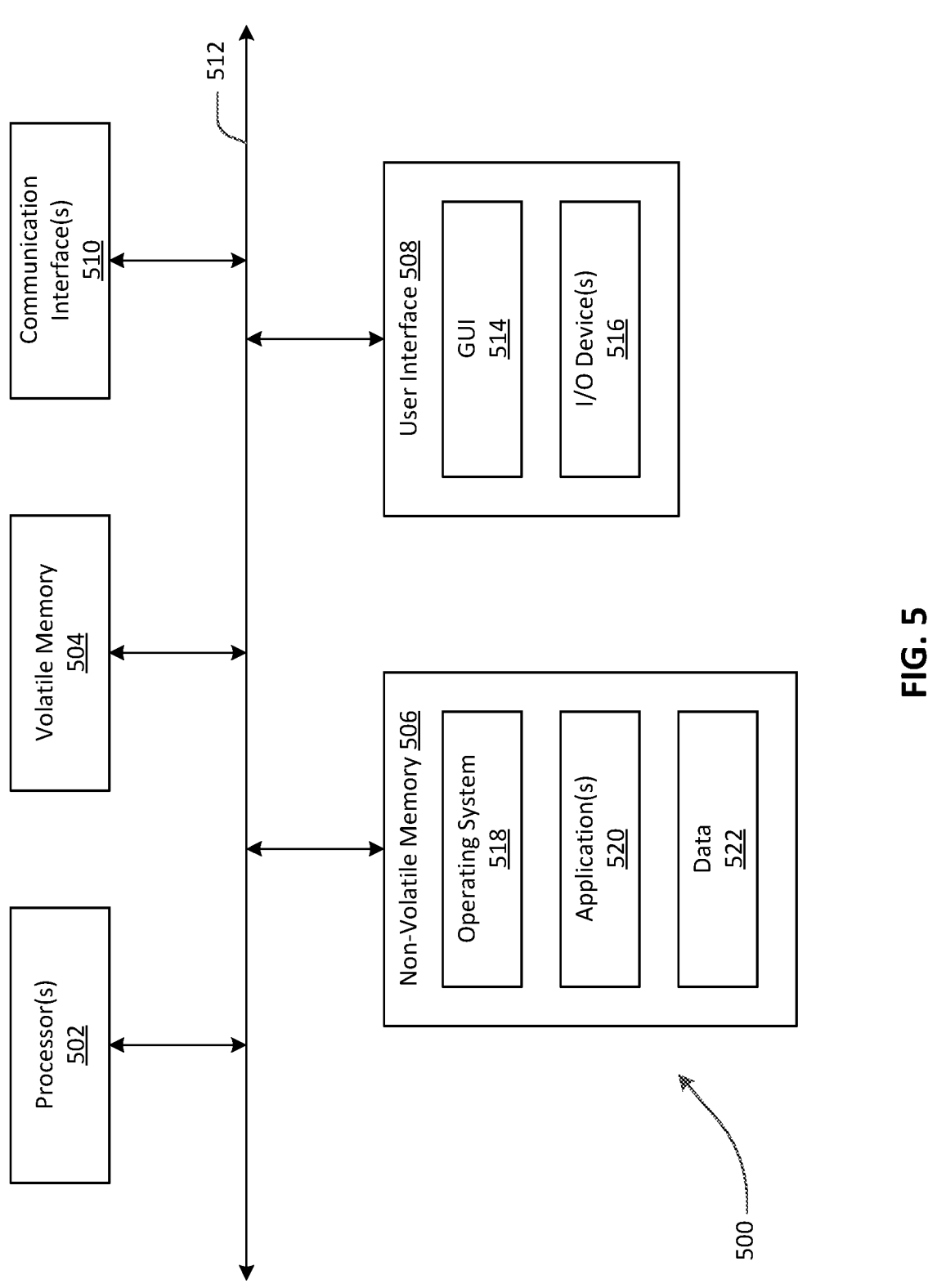
FIG. 5 is a block diagram illustrating selective components of an example computing device in which various aspects of the disclosure may be implemented, in accordance with an embodiment of the present disclosure.

Array management system 132 may include a computing device, such as computing device 500 of FIG. 5. Array management system 132 may be used by a system administrator to re-configure storage array 110, e.g., when degraded performance of storage array 110 is detected.

Network management system 134 may include a computing device, such as computing device 500 of FIG. 5. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
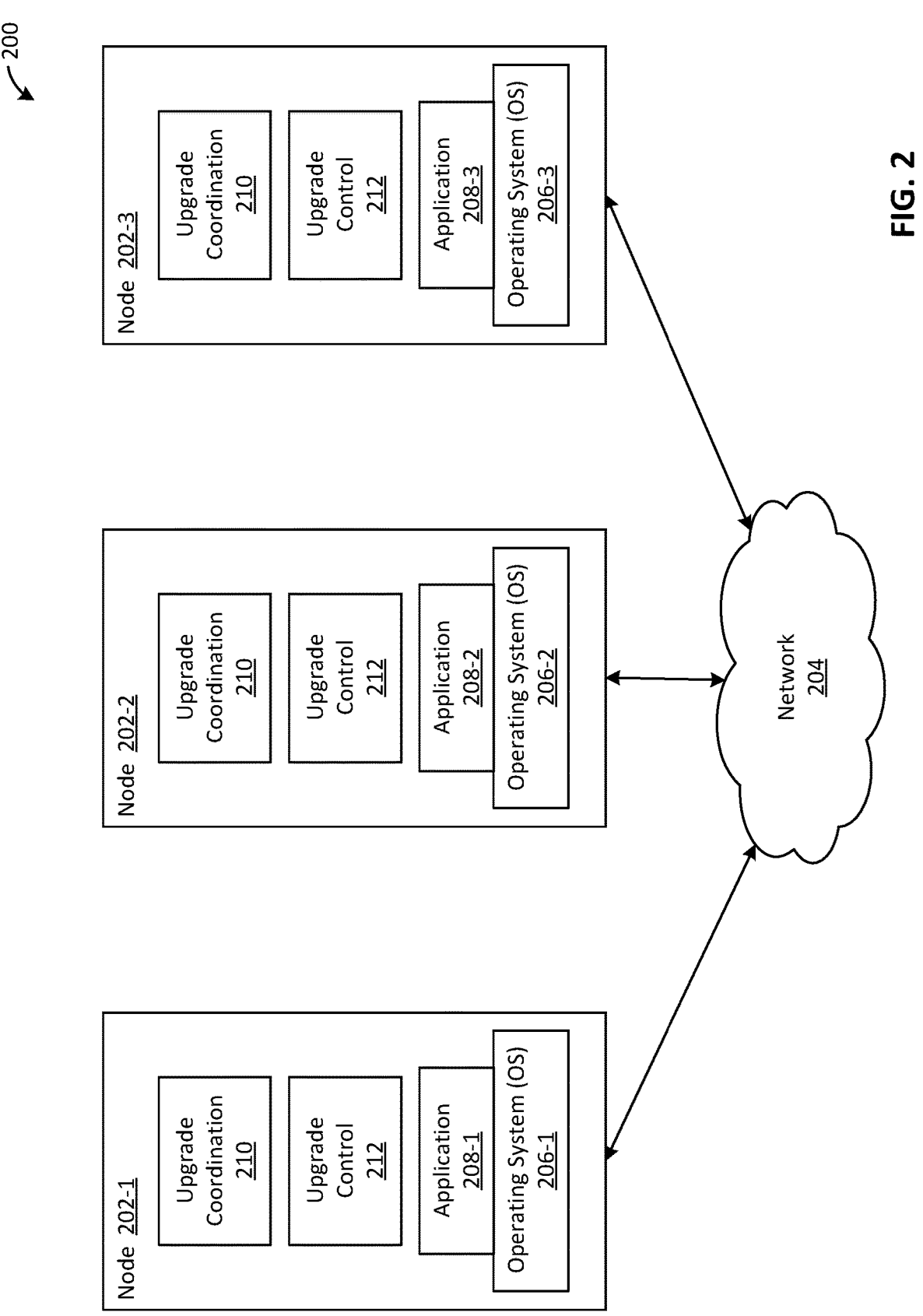
FIG. 2 is a diagram of an illustrative computing environment in which efficient cluster upgrade and downgrade may be implemented, in accordance with an embodiment of the present disclosure.

Referring now to FIG. 2, shown is a diagram of an illustrative computing environment 200 in which efficient cluster upgrade and downgrade may be implemented, in accordance with an embodiment of the present disclosure. As shown, illustrative computing environment 200 includes nodes 202-1, 202-2 202-3 (202 generally) configured to communicate with one another via a network 204. Network 204 may correspond to one or more wireless or wired computer networks including, but not limited to, local-area networks (LANs), metropolitan area networks (MANs), wide area networks (WANs), wireless local-area networks (WLAN), primary public networks, primary private networks, cellular networks, and Wi-Fi (i.e., 802.11) networks. In some cases, node 202 may be the same or similar to host device 130 of FIG. 1 and network 204 may be the same or similar to communications network 120 of FIG. 1.

In some embodiments, nodes 202 may comprise a cluster of compute nodes that perform computational work together in the cluster so they can be viewed as a single system. For example, nodes 202 may comprise physical nodes (e.g., physical server nodes) or virtual nodes (e.g., physical virtual nodes) that host and execute systems (e.g., software systems) that process data and execute tasks and/or workloads and perform computational work to thereby provide compute services to one or more users. In some embodiments, nodes 202 may comprise storage nodes in a storage system (e.g., storage system 100 of FIG. 1). As used herein, the term "user" is intended to be broadly construed so as to encompass numerous arrangements of human, hardware, software, or firmware entities, as well as combinations of such entities. Nodes 202 can include virtual nodes, such as virtual machines, container systems, etc., which perform computational work. While only three nodes 202-1, 202-2, 202-3 are depicted in FIG. 2 for purposes of clarity, the structures and techniques sought to be protected herein can be applied to a cluster composed of any number of nodes 202.

In the following paragraphs, further details may be described with reference to node 202-1, but each of the other nodes (e.g., nodes 202-2 202-3) in environment 200 may be similarly configured. As shown, illustrative node 202-1 can include an operating system (OS) 206-1 that manages software and hardware resources on node 202-1 and provides common services for computer programs, such as one or more applications 208-1. For example, one or more applications 208-1 running on node 202-1 can utilize system calls provided by OS 206-1 to interact with the hardware of node 202-1 (e.g., to perform I/O operations on storage devices, such as, for example, storage devices 114 of FIG. 1).

Illustrative node 202-1 also includes an upgrade coordination module 210 and an upgrade control module 212. Upgrade coordination module 210 on node 202-1 is configured to communicate with respective upgrade coordination modules 210 of the other nodes 202 in the cluster (e.g., upgrade coordination module 210 on node 202-2 and upgrade coordination module 210 on node 202-3) to coordinate an upgrade of the cluster. More particularly, upgrade coordination module 210 is configured to perform a leader election to determine a cluster leader and cluster followers among the nodes 202 in the cluster. In some embodiments, in response to initiation of a cluster update, upgrade coordination module 210 on node 202-1 can communicate with the other upgrade coordination modules 210 on the other nodes 202 in the cluster to perform a leader election to determine which node 202 in the cluster is a cluster leader and which node(s) are cluster followers.

For instance, in one particular implementation, the node in the cluster running the least number of applications (e.g., the node hosting the least number of applications) can be designated the cluster leader and the other nodes can be designated cluster followers. In more detail, upgrade coordination module 210 on each node 202 in the cluster can inform each of the upgrade coordination modules 210 on the other nodes 202 in the cluster of the number of applications being hosted on its node 202. With this information provided by the other upgrade coordination modules, the individual upgrade coordination modules can perform the leader election. As an example, suppose node 202-1 is hosting three applications, node 202-2 is hosting five applications, and node 202-3 is hosting six applications. In this example case, based on performance of the leader election (e.g., communication of the respective number of applications being hosted on each node amongst the nodes and the designation of the node running the least number of applications as the cluster leader), upgrade coordination module 210 on node 202-1 can declare node 202-1 as the cluster leader and the respective upgrade coordination modules 210 on nodes 202-2 202-3 can declare node 202-2 and node 202-3 as cluster followers.

In the same or another implementation, the node in the cluster running the less impactful applications can be designated the cluster leader and the other nodes can be designated cluster followers. The impactful applications and the not impactful applications can be specified by an organization (e.g., organization providing the cluster service) as part of an upgrade policy. The upgrade policy can indicate which applications, or categories of applications, are impactful applications and which applications are not or less impactful applications. For example, the upgrade policy may specify that customer facing applications are impactful applications and non-customer facing applications are not impactful applications. As another example, the upgrade policy may specify different categories of applications. In any case, the upgrade policy may also specify priority values that are to be assigned to the different applications or categories of applications, and the node with the lowest priority value can be designated the cluster leader. As an example, based on the weights specified in the upgrade policy, suppose node 202-1 is determined to have a priority of 2.7, node 202-2 is determined to have a priority of 2.5, and node 202-3 is determined to have a priority of 3.0 based on the applications being hosted on each of nodes 202-1, 202-2, 202-3. In this example case, based on performance of the leader election (e.g., communication of the respective priority values amongst the nodes and the designation of the node having the lowest priority value as the cluster leader), upgrade coordination module 210 on node 202-2 can declare node 202-2 as the cluster leader and the respective upgrade coordination modules 210 on nodes 202-1 202-3 can declare node 202-1 and node 202-3 as cluster followers.

In some embodiments, upgrade coordination module 210 on node 202-1 can monitor the upgrade operation on node 202-1 and provide a notification to the other nodes 202 in the cluster of the completion of the upgrade of node 202-1. For example, in response to completion of an upgrade of node 202-1, upgrade coordination module 210 on node 202-1 can send or otherwise provide a notification to each of the other nodes 202 in the cluster (e.g., to each upgrade coordination module 210 on the other nodes 202 in the cluster) informing of the completion of the upgrade of node 202-1. Providing such notification allows the other nodes 202 in the cluster (e.g., nodes 202 remaining to be upgraded in the cluster) to perform the upgrade. In some embodiments, in response to completion of an upgrade of node 202-1, upgrade coordination module 210 on node 202-1 can send a message to or otherwise initiate another node 202 that is yet to perform the upgrade that causes upgrade control module 212 on that node 202 to perform the upgrade.

Upgrade control module 212 on node 202-1 is configured to control upgrade operations on node 202-1. The upgrade operations may differ for a cluster leader and a cluster follower. In other words, based on the type of node 202-1 (e.g., a cluster leader or a cluster follower), upgrade control module 212 on node 202-1 can perform different upgrade operations to upgrade node 202-1. Also, as previously described, the cluster leader is the node in the cluster that first performs the upgrade.

If node 202-1 is declared a cluster leader, upgrade control module 212 on node 202-1 can perform pre-upgrade readiness checks. For example, upgrade control module 212 on node 202-1 can perform pre-upgrade operations to check the connectivity and health of the cluster and the nodes in the cluster, as well as other cluster-level checks, for performing an upgrade of the cluster. Upon successful completion of the pre-upgrade readiness checks, upgrade control module 212 on node 202-1 can download a software update for upgrading the cluster. The software update may include an updated version of an OS, updated versions of one or more applications, or both. For example, in the case of virtual machines, updates to the OS and applications can be delivered using Open Virtual Appliance (OVA) files (e.g., OS OVA and application OVA). The downloaded software update may be delivered using a delivery mechanism other than OVA files. In any case, upon downloading the software update, upgrade control module 212 on node 202-1 can extract the contents of the software update to a shared memory mechanism, such as, for example, a shared disk, that is accessible by the other nodes 202 in the cluster (e.g., accessible by nodes 202-2 and 202-3). For example, in the case of OVAs and an update to the OS, upgrade control module 212 on node 202-1 can extract the contents of the downloaded OS OVA file to the shared memory mechanism. In the case of OVAs and an update to an application, upgrade control module 212 on node 202-1 can extract the contents of the downloaded application OVA file to the shared memory mechanism. The shared memory mechanism to which the contents of the downloaded software update is extracted to can be understood as providing a common location from which the cluster leader and the cluster follower(s) can retrieve or otherwise obtain the software update.

Upgrade control module 212 performing the upgrade operations on node 202-1 declared the cluster leader can also create a new cluster which includes node 202-1. The new cluster can be created with the parameters provided with the software update (e.g., parameters that came with the updated OS and/or the updated application). For example, upon rebooting node 202-1 with the new OS image in the case where the upgrade includes an updated version of the OS and/or upon installing updated versions of one or more applications on node 202-1 in the case where the upgrade includes updates of the one or more applications, upgrade control module 212 on node 202-1 can stop the applications and cluster services on the other nodes 202 in the cluster (e.g., on follower nodes 202-2 202-3) and create the new cluster. Once the new cluster is created, upgrade control module 212 on node 202-1 can start execution of the applications on node 202-1. In the case where the upgrade includes updates to one or more applications on node 202-1, the applications started on node 202-1 can include updated versions of the one or more applications which were running on node 202-1 and which are updated by the upgrade, as well as current versions of other applications which were running on node 202-1 and which are not updated by the upgrade.

In the case where the upgrade includes an updated version of an OS (e.g., the software update includes an updated OS version), upgrade control module 212 performing the upgrade operations on node 202-1 declared the cluster leader can write the updated version of the OS to an alternate root partition of node 202-1. For example, upgrade control module 212 on node 202-1 can write the updated version of the OS from the shared memory mechanism to the alternate root partition on node 202-1. Upgrade control module 212 on node 202-1 can then prepare node 202-1 for upgrade of the OS. For example, upgrade control module 212 on node 202-1 can migrate the applications running on node 202-1 to another node 202 in the cluster. As a result, the applications on node 202-1 are now hosted on the other node 202 in the cluster to which the applications are migrated to. Upgrade control module 212 on node 202-1 can then prepare node 202-1 for booting with the updated version of the OS from the alternate root partition. The preparation may include, for example, upgrading the boot partition with the boot loader of the updated version of the OS and configuring a file system configuration table to point to the OS (i.e., updated OS version) in the alternate root partition. For example, in the case of a Linux-based OS, the "grub.cfg" can be configured to load the kernel of the updated OS version and the file system configuration table "/etc/fstab" can be configured to point to the updated OS version in the alternate root partition. In another OS, equivalent mechanisms provided by that OS can be configured to load the kernel and point to the updated OS version in the alternate root partition. Upgrade control module 212 on node 202-1 can then initiate a reboot of node 202-1 with the updated version of the OS (i.e., updated OS image) from the alternate root partition. The upgrade control modules performing upgrade operations on the follower nodes in the cluster (e.g., upgrade control modules 212 on nodes 202-2 and 202-3) can perform an update of the OS on their respective nodes 202 in a similar manner as described above with respect to upgrade control module 212 on node 202-1.

In the case where the upgrade includes updated versions of one or more applications (e.g., the software update includes newer versions of one or more applications) on node 202-1, upgrade control module 212 performing the upgrade operations on node 202-1 declared the cluster leader can install the updated versions of the one or more applications on node 202-1 from the shared memory mechanism. Upgrade control module 212 on node 202-1 can also install on node 202-1 current versions of any applications which were running on node 202-1 and which are not updated by the upgrade. As previously described, upgrade control module 212 on node 202-1 can stop the applications and cluster services on the other nodes 202 in the cluster (e.g., on follower nodes 202-2 and 202-3) and create a new cluster which includes node 202-1. Once the new cluster is created, upgrade control module 212 on node 202-1 can start execution of the applications on node 202-1.

In the case where the upgrade includes updated versions of one or more applications and the upgrade is being performed on a cluster follower, upgrade control module 212 performing the upgrade operations on the follower node (e.g., upgrade control module 212 on node 202-2 and upgrade control module 212 on node 202-3) can install the updated versions of the one or more applications on the follower node from the shared memory mechanism. Upgrade control module 212 on the follower node can also install on the follower node current versions of any applications which were running on the follower node and which are not updated by the upgrade. Upgrade control module 212 on the follower node can then join the follower node to a new cluster created by a cluster leader that performed the upgrade of the cluster to which the follower node belongs. That is, upgrade control module 212 on the follower node can join the follower node to the new cluster created by the cluster leader that first performed the cluster upgrade being performed on the follower node. Once the cluster follower is joined to the new cluster, upgrade control module 212 on the follower node can start execution of the applications on the follower node.

FIG. 3 is a flow diagram of an example process 300 for efficient upgrade of a lead node in a cluster, in accordance with an embodiment of the present disclosure. Illustrative process 300 can be implemented within and/or utilized by an upgrade control module (e.g., upgrade control module 212 of FIG. 2) on a node, for example. For the purposes of this discussion, it is assumed that the upgrade of the lead node is part of an upgrade of the cluster (i.e., part of a cluster upgrade). For example, an update coordination module (e.g., update coordination module 210 of FIG. 2) on the node can perform a leader election and declare the node as the lead node. It is also assumed that the upgrade includes a software update to the OS and to an application on the lead node.

With reference to process 300 of FIG. 3, at 302, pre-upgrade readiness checks may be performed. For example, the pre-upgrade readiness checks may be of the nodes and applications and other components of the cluster to determine that the cluster is in condition (e.g., proper state) for the cluster upgrade.

At 304, the software update may be downloaded and extracted to a shared disk. The shared disk can be a disk that is accessible by all the nodes in the cluster. In the case of virtual machines, the software update may be delivered using OVA files, or other suitable delivery mechanisms. The software update can include an updated version of the OS and an updated version of an application. The updated version of the OS may be a newer version or an older version than a current version of the OS that is on the node. The updated version of the application may be a newer version or an older version than a current version of the application that is on the node.

At 306, the updated OS from the shared disk may be written to an alternate root partition. For example, the updated version of the OS downloaded and extracted to the shared disk may be written to an alternate root partition on the node. As a result, the cluster upgrade can be understood as utilizing a dual booting method, having a separate root partition for the current version of the OS that is running on the node and the alternate root partition for the updated version of the OS. At 308, applications running on the lead node may be migrated to a follower node in the cluster.

At 310, the lead node may be configured for booting with the updated OS. For example, the boot partition may be upgraded with the kernel files (e.g., boot loader) of the updated version of the OS from the alternate root partition, and a file system configuration table may be configured to point to the updated version of the OS in the alternate root partition. In the case of a Linux-based OS, the "grub.cfg", "/etc/fstab", or equivalent can be used. At 312, the lead node may be rebooted with the updated OS. As a result, the lead node is upgraded to the updated version of the OS.

At 314, applications may be installed on the lead node. For example, the updated version of the application from the shared disk may be installed on the lead node. The updated version of the application installed on the lead node may be a newer version or an older version of the application that was running on the lead node. As a result, the application on the lead node is upgraded from a current version that was running to the updated version that is installed. Note that updated versions of more than one application may be installed on the lead node from the shared disk as part of the cluster upgrade. It is possible that one or more applications on the lead node are not included in the cluster upgrade. In this case, the current versions (e.g., previous versions) of such applications which were running on the lead node and which are not updated by the upgrade may be installed (e.g., reinstalled) on the lead node.

At 316, applications and cluster services on the follower nodes in the cluster may be stopped. At 318, a new cluster may be created. The new cluster that is created includes the lead node. At 320, applications on the lead node may be started. As a result, applications running on the lead node include updated versions of applications which were running on the lead node and which are updated by the upgrade, as well as current versions of other applications which were running on the lead node and which are not updated by the upgrade. Once the applications are running on the lead node, the new cluster is available to service client requests. It will be appreciated that the duration the cluster is not available to service client requests (e.g., the duration from the time applications and cluster services on the follower nodes are stopped to the time the new cluster is created and the applications started on the lead node) is minimal and, as a result, provides maximum availability to service client requests.

At 322, a follower node in the cluster may be initiated to perform the cluster upgrade. For example, upon completion of the upgrade of the lead node (e.g., upon starting the applications on the lead node), a follower node in the cluster that is yet to be updated may be initiated to perform the cluster upgrade.

Figure 4:
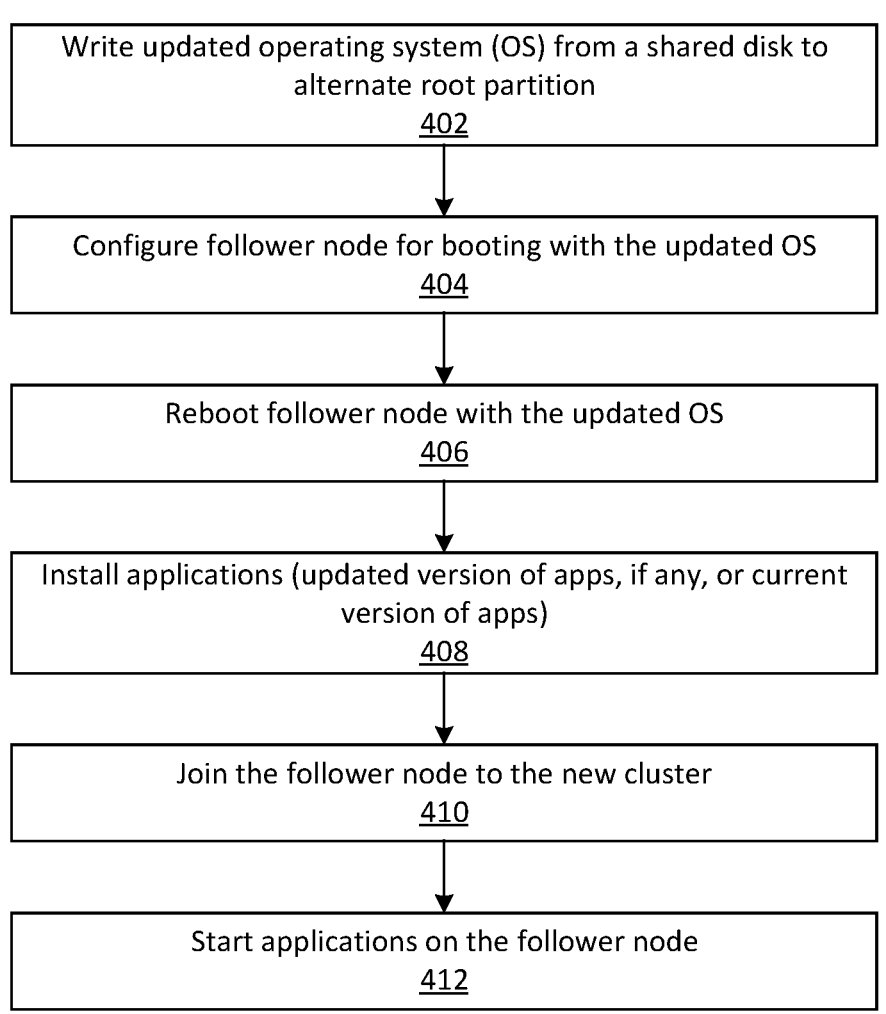
FIG. 4 is a flow diagram of an example process for efficient upgrade of a follower node in a cluster, in accordance with an embodiment of the present disclosure.

FIG. 4 is a flow diagram of an example process 400 for efficient upgrade of a follower node in a cluster, in accordance with an embodiment of the present disclosure. Illustrative process 400 can be implemented within and/or utilized by an upgrade control module (e.g., upgrade control module 212 of FIG. 2) on a node, for example. For the purposes of this discussion, it is assumed that the upgrade of the follower node is part of an upgrade of the cluster (i.e., part of a cluster upgrade). For example, an update coordination module (e.g., update coordination module 210 of FIG. 2) on the node can perform a leader election and declare the node as the follower node. It is also assumed that the upgrade includes a software update to the OS and to an application on the follower node. It is further assumed that the upgrade of the follower node is subsequent to an upgrade of a lead node in the cluster as discussed above with respect to process 300 of FIG. 3, for example.

With reference to process 400 of FIG. 4, at 402, the updated OS from the shared disk may be written to an alternate root partition. For example, the updated version of the OS downloaded and extracted to the shared disk by the cluster leader (e.g., block 304 of process 300 of FIG. 3) may be written to an alternate root partition on the node. As a result, the cluster upgrade can be understood as utilizing a dual booting method, having a separate root partition for the current version of the OS that is running on the node and the alternate root partition for the updated version of the OS.

At 404, the follower node may be configured for booting with the updated OS. For example, the boot partition may be upgraded with the kernel files (e.g., boot loader) of the updated version of the OS from the alternate root partition, and a file system configuration table may be configured to point to the updated version of the OS in the alternate root partition. In the case of a Linux-based OS, the "grub.cfg", "/etc/fstab", or equivalent can be used. At 406, the follower node may be rebooted with the updated OS. As a result, the follower node is upgraded to the updated version of the OS.

At 408, applications may be installed on the follower node. For example, the updated version of the application from the shared disk may be installed on the follower node. The updated version of the application installed on the follower node may be a newer version or an older version of the application that was running on the follower node. As a result, the application on the follower node is upgraded from a current version that was running to the updated version that is installed. Note that updated versions of more than one application may be installed on the follower node from the shared disk as part of the cluster upgrade. It is possible that one or more applications on the follower node are not included in the cluster upgrade. In this case, the current versions (e.g., previous versions) of such applications which were running on the follower node and which are not updated by the upgrade may be installed (e.g., reinstalled) on the follower node.

At 410, the follower node may be joined to a new cluster. The new cluster is the cluster that is created by the cluster leader as part of its upgrade (e.g., block 318 of process 300 of FIG. 3). At 412, applications on the follower node may be started. As a result, applications running on the follower node include updated versions of applications which were running on the follower node and which are updated by the upgrade, as well as current versions of other applications which were running on the follower node and which are not updated by the upgrade.

FIG. 5 is a block diagram illustrating selective components of an example computing device 500 in which various aspects of the disclosure may be implemented, in accordance with an embodiment of the present disclosure. For example, illustrative computing device 500 can perform all or part of the processes described herein. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described with reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital, or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
determining, by a node, whether the node is a lead node in a cluster including the lead node and one or more follower nodes; and
responsive to a determination that the node is the lead node in the cluster, by the lead node:
downloading a software update, wherein the software update includes an updated version of an operating system (OS);
extracting the software update to a shared disk;
writing the updated version of the OS to an alternate root partition of the lead node;
migrating one or more first applications from the lead node to one of the one or more follower nodes in the cluster;
rebooting the lead node using the alternate root partition with the updated version of the OS;
installing one or more second applications on the lead node;
stopping applications and cluster services on the one or more follower nodes in the cluster, wherein the applications include the one or more first applications;
creating a new cluster, wherein the new cluster includes the lead node; and
starting the one or more second applications on the lead node.

2. The method of claim 1, wherein the updated version of the OS is a newer version of the OS.

3. The method of claim 1, wherein the updated version of the OS is an older version of the OS.

4. The method of claim 1, wherein one of the one or more second applications is a same version of one of the one or more first applications.

5. The method of claim 1, wherein the software update includes a newer version of one of the one or more first applications, and wherein the one or more second applications include the newer version of one of the one or more first applications.

6. The method of claim 1, wherein the software update includes an older version of one of the one or more first applications, and wherein the one or more second applications include the older version of one of the one or more first applications.

7. The method of claim 1, further comprising:
responsive to a determination that the node is one of the one or more follower nodes in the cluster, by the follower node:
writing the updated version of the OS from the shared disk to an alternate root partition of the follower node;
rebooting the follower node using the alternate root partition with the updated version of the OS;
installing one or more third applications on the follower node;
joining the new cluster, wherein the new cluster includes the lead node; and
starting the one or more third applications on the follower node.

8. The method of claim 7, wherein the updated version of the OS is one of a newer version of the OS or an older version of the OS.

9. The method of claim 7, wherein the one or more third applications include a current version of an application on the follower node.

10. The method of claim 7, wherein the one or more third applications include a newer version of an application on the follower node.

11. The method of claim 7, wherein the one or more third applications include an older version of an application on the follower node.

12. A computing device comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
determining whether the computing device is a lead node in a cluster including the lead node and one or more follower nodes; and
responsive to a determination that the computing device is the lead node in the cluster:
downloading a software update, wherein the software update includes an updated version of an operating system (OS);
extracting the software update to a shared disk;
writing the updated version of the OS to an alternate root partition of the lead node;
migrating one or more first applications from the lead node to one of the follower nodes in the cluster;
rebooting the lead node using the alternate root partition with the updated version of the OS;
installing one or more second applications on the lead node;
stopping applications and cluster services on the one or more follower nodes in the cluster, wherein the applications include the one or more first applications;
creating a new cluster, wherein the new cluster includes the lead node; and
starting the one or more second applications on the lead node.

13. The computing device of claim 12, wherein the updated version of the OS is one of a newer version of the OS or an older version of the OS.

14. The computing device of claim 12, wherein the software update includes a newer version of one of the one or more first applications, and wherein the one or more second applications include the newer version of one of the one or more first applications.

15. The computing device of claim 12, wherein the software update includes an older version of one of the one or more first applications, and wherein the one or more second applications include the older version of one of the one or more first applications.

16. The computing device of claim 12, wherein the process further comprises:
responsive to a determination that the computing device is one of the one or more follower nodes in the cluster:
writing the updated version of the OS from the shared disk to an alternate root partition of the follower node;
rebooting the follower node using the alternate root partition with the updated version of the OS;
installing one or more third applications on the follower node;
joining the new cluster, wherein the new cluster includes the lead node; and
starting the one or more third applications on the follower node.

17. The computing device of claim 16, wherein the updated version of the OS is one of a newer version of the OS or an older version of the OS.

18. The computing device of claim 16, wherein the one or more third applications include a newer version of an application on the follower node.

19. The computing device of claim 16, wherein the one or more third applications include an older version of an application on the follower node.

20. A non-transitory machine-readable medium encoding instructions that when executed by one or more processors cause a process to be carried out, the process including:
determining, by a node, whether the node is a lead node in a cluster including the lead node and one or more follower nodes;
responsive to a determination that the node is the lead node in the cluster, by the lead node:
downloading a software update, wherein the software update includes an updated version of an operating system (OS);
extracting the software update to a shared disk;
writing the updated version of the OS to an alternate root partition of the lead node;
migrating one or more first applications from the lead node to one of the one or more follower nodes in the cluster;
rebooting the lead node using the alternate root partition with the updated version of the OS;
installing one or more second applications on the lead node;
stopping applications and cluster services on the one or more follower nodes in the cluster, wherein the applications include the one or more first applications;
creating a new cluster, wherein the new cluster includes the lead node; and
starting the one or more second applications on the lead node; and
responsive to a determination that the node is one of the one or more follower nodes in the cluster, by the follower node:

writing the updated version of the OS from the shared disk to an alternate root partition of the follower node;

rebooting the follower node using the alternate root partition with the updated version of the OS;

installing one or more third applications on the follower node;

joining the new cluster, wherein the new cluster includes the lead node; and starting the one or more third applications on the follower node.

* * * * *